(12) United States Patent
Shaeffer et al.

(10) Patent No.: US 9,880,063 B2
(45) Date of Patent: Jan. 30, 2018

(54) PRESSURE SENSOR STABILIZATION

(71) Applicant: InvenSense, Inc., San Jose, CA (US)

(72) Inventors: Derek Shaeffer, Redwood City, CA (US); Stanley Wang, Cupertino, CA (US)

(73) Assignee: INVENSENSE, INC., San Jose, CA (US)

( * ) Notice: Subject to any disclaimer, the term of this patent is extended or adjusted under 35 U.S.C. 154(b) by 170 days.

(21) Appl. No.: 14/195,736

(22) Filed: Mar. 3, 2014

(65) Prior Publication Data
US 2014/0260647 A1   Sep. 18, 2014

Related U.S. Application Data (60) Provisional application No. 61/780,402, filed on Mar. 13, 2013.

(51) Int. Cl.
*G01L 9/00* (2006.01)
*G01L 9/12* (2006.01)

(52) U.S. Cl.
CPC .............. *G01L 9/0072* (2013.01); *G01L 9/12* (2013.01)

(58) Field of Classification Search
CPC ................................. G01L 9/12; G01L 9/0072
USPC .................................................... 73/702–724
See application file for complete search history.

(56) References Cited

U.S. PATENT DOCUMENTS

| | | | | |
|---|---|---|---|---|
| 3,762,223 A * | 10/1973 | Feuer | ................. | G01L 9/0016 73/702 |
| 4,507,623 A * | 3/1985 | Fosco | ................. | G05D 19/02 310/36 |
| 4,544,891 A * | 10/1985 | Karwacki | .............. | G01C 19/62 324/301 |
| 4,683,754 A * | 8/1987 | Hirata | .................... | G01L 9/125 73/708 |
| 4,732,043 A * | 3/1988 | Bell | ........................ | G01R 23/10 73/708 |
| 5,089,695 A * | 2/1992 | Willson | .................. | G01L 9/002 250/227.21 |
| 5,129,262 A * | 7/1992 | White | .................... | G01H 13/00 310/313 R |
| 5,142,912 A * | 9/1992 | Frische | ................. | G01L 9/0016 338/4 |
| 5,663,506 A * | 9/1997 | Moore | .................. | G01L 9/0075 73/708 |
| 6,085,594 A * | 7/2000 | Gutierrez | .............. | G01L 9/0008 73/704 |
| 6,119,523 A * | 9/2000 | Olsson | ...................... | G01L 9/12 361/283.4 |
| 6,374,191 B1 * | 4/2002 | Tsuchiya | ............... | G01L 27/002 702/104 |
| 6,954,020 B2 * | 10/2005 | Ma | .......................... | H03H 9/24 310/309 |

(Continued)

OTHER PUBLICATIONS

Fax Cover.*
ID-161.*

*Primary Examiner* — Lisa Caputo
*Assistant Examiner* — Tran M Tran
(74) *Attorney, Agent, or Firm* — Duane Morris LLP; Amir Tabarrok (57) ABSTRACT

A pressure sensor is provided which produces a measurement of the displacement and a measurement of a natural frequency of the diaphragm which are then combined to produce a compensated measurement of the displacement of the diaphragm, thereby substantially eliminating the dependence of the compensated displacement measurement on strain.

20 Claims, 7 Drawing Sheets

(56) References Cited

U.S. PATENT DOCUMENTS

| | | | | |
|---|---|---|---|---|
| 7,017,418 B1* | 3/2006 | Thakre | ................ | G01L 9/0008 |
| | | | | 73/716 |
| 7,165,452 B2* | 1/2007 | Kobayashi | ............... | G01G 3/16 |
| | | | | 73/580 |
| 7,308,830 B2* | 12/2007 | Harasyn | ................ | G01L 27/007 |
| | | | | 361/283.1 |
| 7,543,501 B2* | 6/2009 | Cottles | ................ | G01L 27/007 |
| | | | | 73/715 |
| 7,605,391 B2* | 10/2009 | Burns | ..................... | G01L 9/002 |
| | | | | 257/21 |
| 8,429,978 B2* | 4/2013 | Klosinski | ............. | G01L 9/0016 |
| | | | | 73/716 |
| 8,490,495 B2* | 7/2013 | Lee | ...................... | G01L 9/0073 |
| | | | | 73/715 |
| 8,620,599 B2* | 12/2013 | Ohmori | .................. | G01L 5/042 |
| | | | | 702/43 |
| 8,826,742 B2* | 9/2014 | Nakamura | ............ | B81B 3/0021 |
| | | | | 73/777 |
| 8,833,171 B2* | 9/2014 | Besling | ................ | G01L 9/0042 |
| | | | | 73/702 |
| 8,997,575 B2* | 4/2015 | Ferran | ...................... | G01L 9/12 |
| | | | | 73/724 |
| 9,383,285 B2* | 7/2016 | Phan Le | ............ | B81C 1/00158 |
| 9,680,414 B1* | 6/2017 | Chen | ...................... | H03B 5/30 |
| 9,689,770 B2* | 6/2017 | Hammerschmidt | .. | G01L 27/005 |
| 2007/0225934 A1* | 9/2007 | Moriya | .................... | G01F 1/42 |
| | | | | 702/138 |
| 2008/0006094 A1* | 1/2008 | Schulte | .................... | G01F 1/34 |
| | | | | 73/736 |
| 2016/0131550 A1* | 5/2016 | Besling | ................ | G01L 9/0072 |
| | | | | 702/98 |

\* cited by examiner

PRESSURE SENSOR STABILIZATION

CROSS-REFERENCE TO RELATED APPLICATION

This application claims benefit under 35 USC 119(e) of U.S. Provisional Patent Application No. 61/780,402, filed on Mar. 13, 2013, entitled "PRESSURE SENSOR STABILIZATION," which is incorporated herein by reference in its entirety.

FIELD OF THE INVENTION

The present invention relates generally to pressure sensors, and more particularly relates to improving the stability of pressure sensors for improved performance.

BACKGROUND

Pressure sensors are used in a variety of applications. Typically pressure sensors are implemented in offerings requiring the measurement of pressure in relation to the operating conditions or environment of the device. Pressure sensors may often be used in medical devices, engines, electronic applications and portable implementations, for example.

For example, an ultra-miniature, piezo-resistive silicon pressure sensor die may have application in monitoring pressure from the tip of a catheter. Such a pressure sensor would typically be in communicative contact with a circuit having a memory/control logic in which there is an input and output. Pressure sensors incorporating micro-electro-mechanical systems (MEMS) have even greater utility and application. As used herein, the term pressure sensor is intended to include any pressure sensor.

While a pressure sensor may be customized or selected for its particular characteristics such as pressure range, environmental or operating conditions, communication interface, footprint, etc., often, despite careful selection over these characteristics, a pressure sensor's accuracy and stability are the two essential operating parameters. Providing for stability in a pressure sensor is an important aspect of accurately assessing an operating environment. For instance, a change of sensitivity could cause a large error to the pressure sensor and inaccurately cause other dependent devices apart of the overall system to respond inappropriately. Similarly, pressure sensors, or transducers, can also become unstable due to electrostatic charge, mechanical stresses, wiring connections and temperature changes.

Unfortunately, while accuracy of a pressure sensor is often related to the quality of the device, the stability may not be so as pressure sensors may become unstable during assembly, operation, or even during packaging, the instability typically resulting from a sensor sensitivity shift.

Therefore what is desired is an approach to improve the stability of a pressure sensor by compensating a pressure sensor's sensitivity shift due to packaging and/or assembly by stabilizing the sensitivity and reducing the error caused by strain-related sensitivity shift. Additionally it would be further desired to have an approach that will also provide for eliminating the sensitivity calibration of a pressure sensor after packaging or assembly, such that the option of providing for less costly packaging may be realized.

SUMMARY

The present invention fulfills these needs and has been developed in response to the present state of the art, and in particular, in response to the problems and needs in the art that have not yet been fully solved by currently available technologies.

One embodiment of the present invention provides for a pressure sensor comprising: a diaphragm, wherein a displacement of the diaphragm is responsive to pressure; a sensing system producing a measurement of the displacement; and an oscillator system for producing a measurement of a natural frequency of the diaphragm. Preferably, for the present invention, the measurement of the displacement and the measurement of a natural frequency of the diaphragm are combined to produce a compensated measurement of the displacement of the diaphragm.

Another embodiment of the present invention provides for a pressure sensor stabilization method comprising the steps of: measuring a diaphragm displacement responsive to pressure and strain and measuring a diaphragm natural frequency responsive to strain. The method then provides for compensating the displacement measurement with the natural frequency measurement to thereby substantially eliminate dependence of the compensated displacement measurement on strain.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

It will be appreciated that FIGS. 1-5 represent various arrangements for the present invention in which common numerals may be used for schematic labeling for each arrangement; however, the present invention is not so limited to only these arrangements depicted nor is the present invention limited to only the components presented in the schematic representations. As such, to avoid redundant explanation of common numerals, reference to numerals may be drawn from any figure presented herein. For instance, in each FIG. 1-5, the depicted pressure sensor MEMS device 120 includes a MEMS diaphragm 123, drive electrodes 121, and a sense electrode 122. "$P_{in}$" is the input pressure exerted on the MEMS diaphragm 123 causing it to displace and change the sense capacitance on sense electrode 122. "$S_{in}$" is the strain exerted on the MEMS diaphragm 123. "mode" is the input control signal to selectively operate the pressure sensor under "displacement mode (mode "d")" to measure the input pressure or "frequency mode (mode "f")" to measure the natural frequency of the diaphragm. "$P_{out}$" is the pressure sensor digital reading, and "$P'_{out}$" is the final pressure sensor digital reading after calibrated by the strain gauge. In operation, movement across the diaphragm 123 is measured by sensing the motion across the sense electrode 122. Similarly, other renditions are understood to provide for common descriptions as well.

Figure 1:
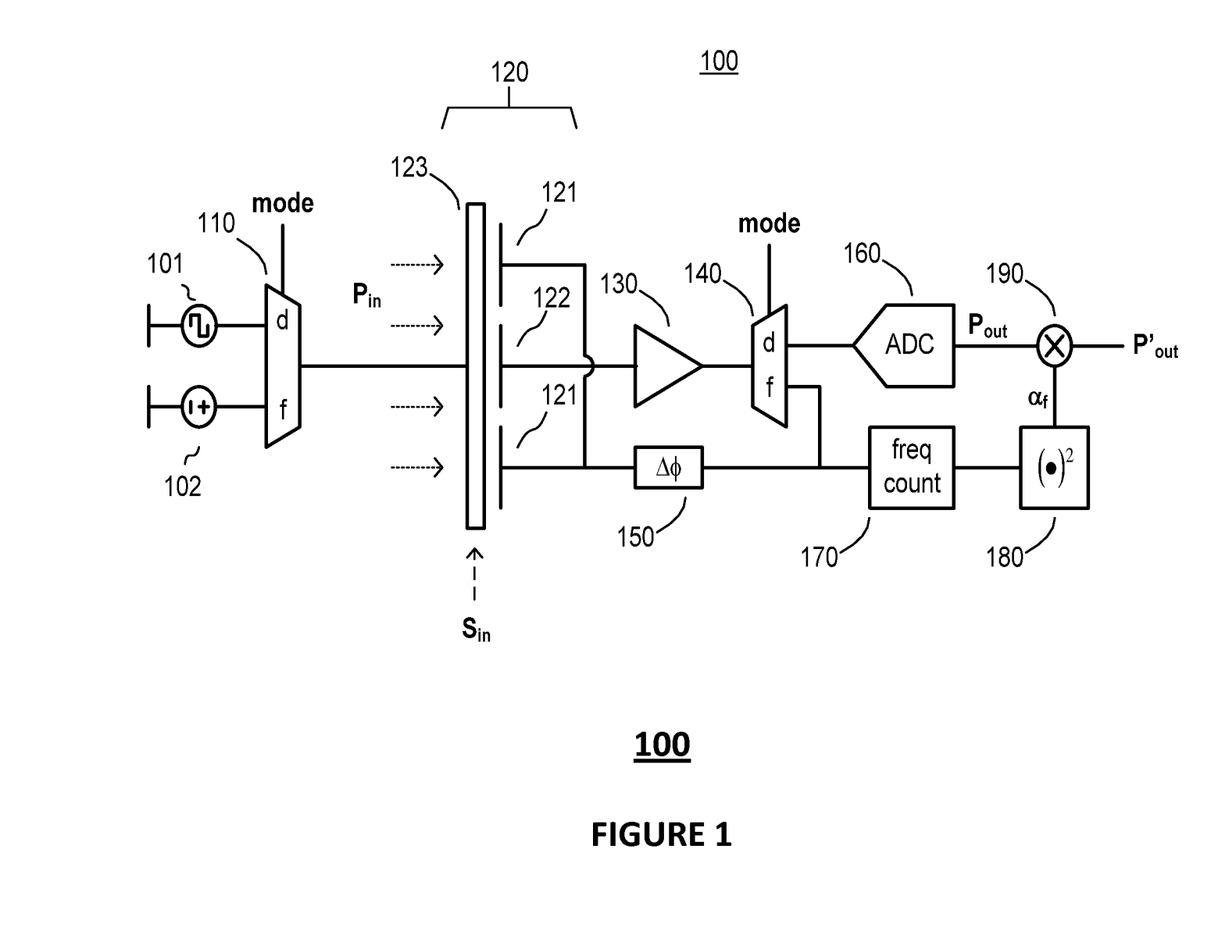
FIG. 1 is the block diagram of a pressure sensor with sensitivity stabilization in accordance with one or more embodiments of the present invention.

FIG. 1 is the block diagram of a pressure sensor 100 with sensitivity stabilization in accordance with one or more embodiments of the present invention.

From FIG. 1, the pressure sensor 100, in a preferred embodiment, includes a drive voltage 101, a DC voltage source 102, and a multiplexer 110. The pressure sensor further includes a pressure sensor MEMS device 120, a sense amplifier 130, a multiplexer 140 and a phase shifter 150. Additionally, the pressure sensor includes an analog-to-digital converter (ADC) 160, a frequency counter 170, a digital square calculator 180 and a digital multiplier 190.

The pressure sensor MEMS device 120 includes a MEMS diaphragm 123, drive electrodes 121, and a sense electrode 122, as described previously.

In one or more embodiments, when operating the present invention in "displacement mode", a voltage source with periodic waveform 101 drives the MEMS diaphragm 123 with amplitude $V_d$ through the multiplexer 110. As a result, in a preferred embodiment, a total signal charge of $Q_s = C_s \times V_d$ is transferred into the sense amplifier 130, processed, and converted by the ADC 160 to digital signal $P_{out}$ through the multiplexer 140.

For the present invention, sense capacitance is:

$$C_s = \varepsilon \frac{A_s}{g_0 - d},$$

where $\varepsilon$ is the dielectric permittivity of the material between diaphragm and electrode, $A_s$ is the effective area of the sense electrode, $g_0$ is the electrode gap when input pressure is zero, and d is the displacement caused by the input pressure.

Additionally, for the present invention, the relationship between displacement d and input pressure $P_{in}$ is:

$$d = \frac{P_{in} A_{eff}}{k_d},$$

where $A_{eff}$ is the effective area of the diaphragm, $k_d$ is the spring constant of the diaphragm, and $k_d$ is dependent on the strain on the diaphragm, $S_{in}$.

The strain $S_{in}$ is composed of two parts: $S_{in,0}$ and $S_{in,p}$, where $S_{in,0}$ is the strain from the chip itself, and $S_{in,p}$ is the strain from the package and assembly.

It will be appreciated by those skilled in the art that when the chip is a bare die, only $S_{in,0}$ is applied to the diaphragm and $k_d = k_{d,0}$. The sensitivity of the pressure sensor is equal to $$\frac{A_{eff}}{k_{d,0}}.$$

However, after the chip is packaged and assembled, the total strain becomes $S_{in,0} + S_{in,p}$ and the spring constant $k_d = k_{d,0} + k_{d,p}$. As a result, the sensitivity of the pressure sensor then changes from $$\frac{A_{eff}}{k_{d,0}}$$

to $$\frac{A_{eff}}{k_{d,0} + k_{d,p}}.$$

Accordingly, the change of sensitivity may create a large error to the pressure sensor and impact its accuracy. Therefore, using the present invention, the "frequency mode (mode "f")" may be utilized to mitigate the issue.

In the present invention, returning to FIG. 1, when operating in the "frequency mode (mode "f")", DC voltage 102 is applied to the diaphragm 123 through multiplexer 110 to lower its motional impedance. The sense electrode 122 is connected to the input of the sense amplifier 130. The sense amplifier 130 drives the phase shifter 150 through the multiplexer 140 while the phase shifter 150 drives the drive electrodes 121.

This arrangement of the present invention creates a loop from the diaphragm sense electrode 122 to its drive electrodes 121. The phase shift introduced by the phase shifter 150 is such that an oscillation occurs within this loop and the oscillation frequency is mainly determined by the natural frequency of the diaphragm, which is defined as $$f_{osc} = \frac{1}{2\pi} \sqrt{\frac{k_d}{m}},$$

where m is the mass of the diaphragm.

The oscillation frequency is measured by the frequency counter 170, and the output is squared by the digital square calculator 180 to generate a calibration coefficient $\alpha_f$. The calibration coefficient $\alpha_f$, in one or more embodiments, is then multiplied with the pressure sensor output $P_{out}$ to correct the error caused by the package/assembly shift and produce $P'_{out}$.

As will be appreciated in association with the equation of the oscillation frequency $f_{osc}$, assuming mass m is a constant, the square of the oscillation frequency ($f_{osc}^2$) is linearly proportional to the spring constant $k_d$. When spring constant changes from $k_{d,0}$ to $k_{d,0} + k_{d,p}$ due to packaging/assembly shift, $f_{osc}^2$ changes from $$\frac{1}{(2\pi)^2} \frac{k_{d,0}}{m}$$

to $$\frac{1}{(2\pi)^2} \frac{k_{d,0} + k_{d,p}}{m}, P'_{out} = \alpha_f P_{out} \propto \frac{k_{d,0} + k_{d,p}}{m} \frac{A_{eff}}{k_{d,0} + k_{d,p}} = \frac{A_{eff}}{m},$$

which is independent of the spring constant $k_d$. Therefore, using the present invention, the sensitivity shift is compensated and the sensitivity is stabilized.

Figure 2:
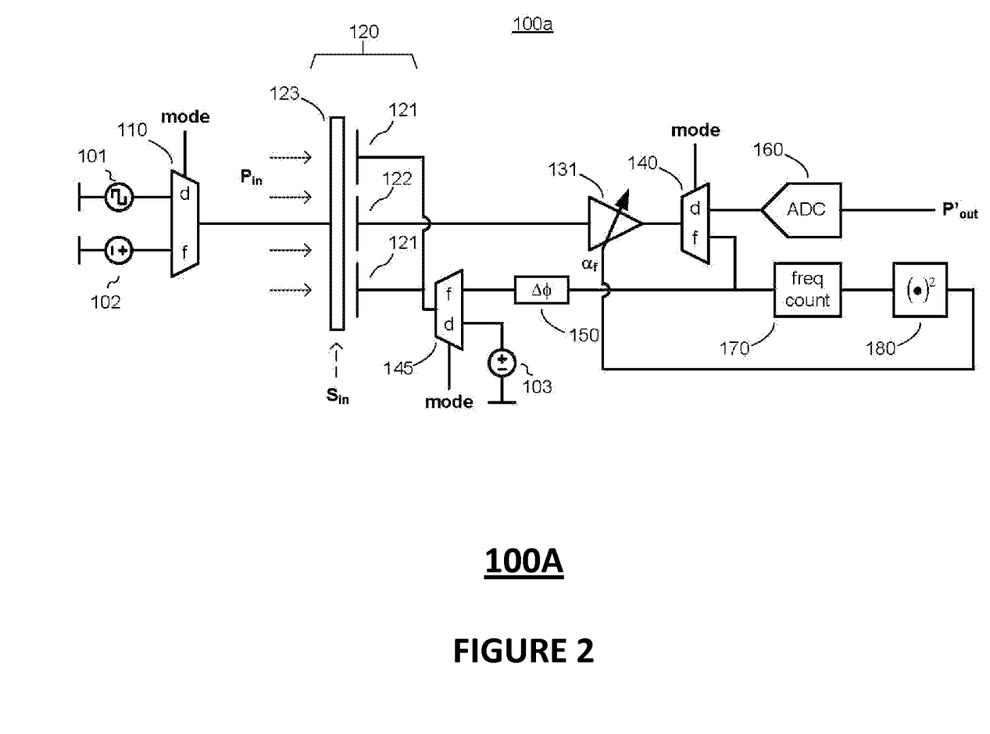
FIG. 2 is the block diagram of a pressure sensor with sensitivity stabilization having a sense amp in accordance with one or more embodiments of the present invention.

FIG. 2 is the block diagram of a pressure sensor with sensitivity stabilization having a sense amp in accordance with one or more embodiments of the present invention.

From FIG. 2, the pressure sensor 100A, in a preferred embodiment, includes similar components as set forth in FIG. 1. The pressure sensor 100A includes a drive voltage 101, a DC voltage source 102, and a first multiplexer 110. The pressure sensor further includes a pressure sensor MEMS device 120, a second multiplexer 145, a sense amplifier 131, a third multiplexer 140, and a phase shifter 150. Additionally, the pressure sensor includes an analog-to-digital converter (ADC) 160, a frequency counter 170 and a digital square calculator 180.

In the embodiment of FIG. 2, when operating the present invention in "displacement mode", a voltage source with periodic waveform 101 drives the MEMS diaphragm 123 with amplitude $V_d$ through the multiplexer 110. As in FIG. 1, a total signal charge of $Q_s$ is transferred into the sense amplifier 131 which also receives the calibration coefficient $\alpha_f$ from the calculator 180 as an input from a loopback, is processed, and converted by the ADC 160 to digital signal $P'_{out}$ (final pressure sensor digital reading after calibrated by the strain gauge) through the multiplexer 140. The drive electrodes 121 is biased at a DC voltage by voltage source 103 through the multiplexer 145.

From FIG. 2, when operating in the "frequency mode (mode "f")", DC voltage 102 is applied to the diaphragm 123 through multiplexer 110 to lower its motional impedance. The sense electrode 122 is connected to the input of the sense amplifier 131. The sense amplifier 131 drives the phase shifter 150 through the multiplexer 140 while the phase shifter 150 drives the drive electrodes 121 through multiplexer 145. The multiplexer 145 is also connected with the voltage source 103. The oscillation frequency is measured by the frequency counter 170, and the output is squared by the digital square calculator 180 to generate a calibration coefficient $\alpha_f$. The calibration coefficient $\alpha_f$ is then applied to the sense amplifier 131 to modify the gain of the sense amplifier 131 in proportion to the calibration coefficient, thereby stabilizing the sensitivity.

Figure 3:
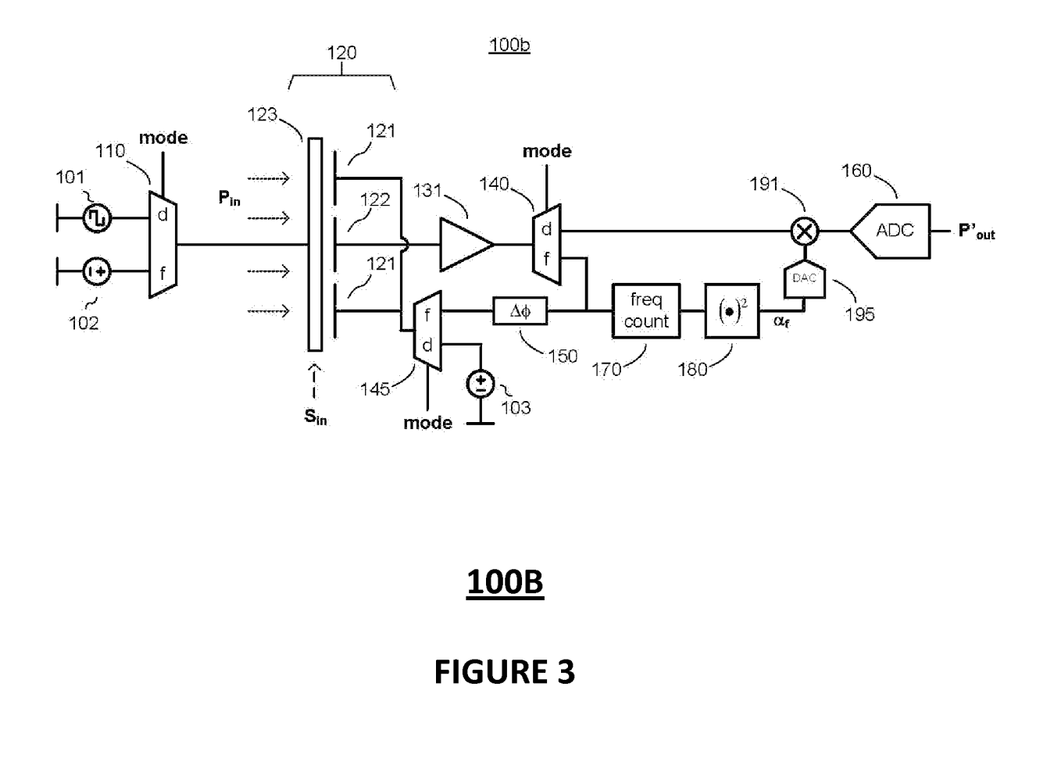
FIG. 3 is the block diagram of a pressure sensor with sensitivity stabilization including a digital to analog (DAC) converter, in accordance with one or more embodiments of the present invention.

FIG. 3 is the block diagram of a pressure sensor with sensitivity stabilization including a digital to analog (DAC) converter, in accordance with one or more embodiments of the present invention.

From FIG. 3, the pressure sensor 1008, in a preferred embodiment, includes similar components as set forth in FIGS. 1 and 2. The pressure sensor 1008 includes a drive voltage 101, a DC voltage source 102, and a first multiplexer 110. The pressure sensor further includes a pressure sensor MEMS device 120, a second multiplexer 145, a sense amplifier 131, a third multiplexer 140, and a phase shifter 150. Additionally, the pressure sensor includes an analog-to-digital converter (ADC) 160, a frequency counter 170, a digital square calculator 180, an analog multiplier 191 and a DAC 195.

In the embodiment of FIG. 3, when operating the present invention in "displacement mode", a voltage source with periodic waveform 101 drives the MEMS diaphragm 123 with amplitude $V_d$ through the multiplexer 110. As in FIGS. 1 and 2, a total signal charge of $Q_s$ is transferred into the sense amplifier 131, is processed, and converted by the ADC 160 to digital signal $P'_{out}$ after receiving input from a multiplier 191 having input of the multiplexer 140 and further input of the output of a DAC 195 which had input of the calibration coefficient from the calculator 180.

From FIG. 3, when operating in the "frequency mode (mode "f")", DC voltage 102 is applied to the diaphragm 123 through multiplexer 110 to lower its motional impedance. The sense electrode 122 is connected to the input of the sense amplifier 131. The sense amplifier 131 drives the phase shifter 150 through the multiplexer 140 while the phase shifter 150 drives the drive electrodes 121 through multiplexer 145. The multiplexer 145 is also connected with the voltage source 103. The oscillation frequency is measured by the frequency counter 170, and the output is squared by the digital square calculator 180 to generate a calibration coefficient $\alpha_f$. The calibration coefficient $\alpha_f$ is then applied to the DAC 195 whose output is then applied to multiplier 191 to modify the gain of the sensor 100b in proportion to the calibration coefficient, thereby stabilizing the sensitivity.

From FIG. 3, a pressure sensor is provided in which there is a multiplier block between the sense amplifier and the ADC, wherein multiplier block provides combined measurement outputs of displacement and natural frequency.

Figure 4:
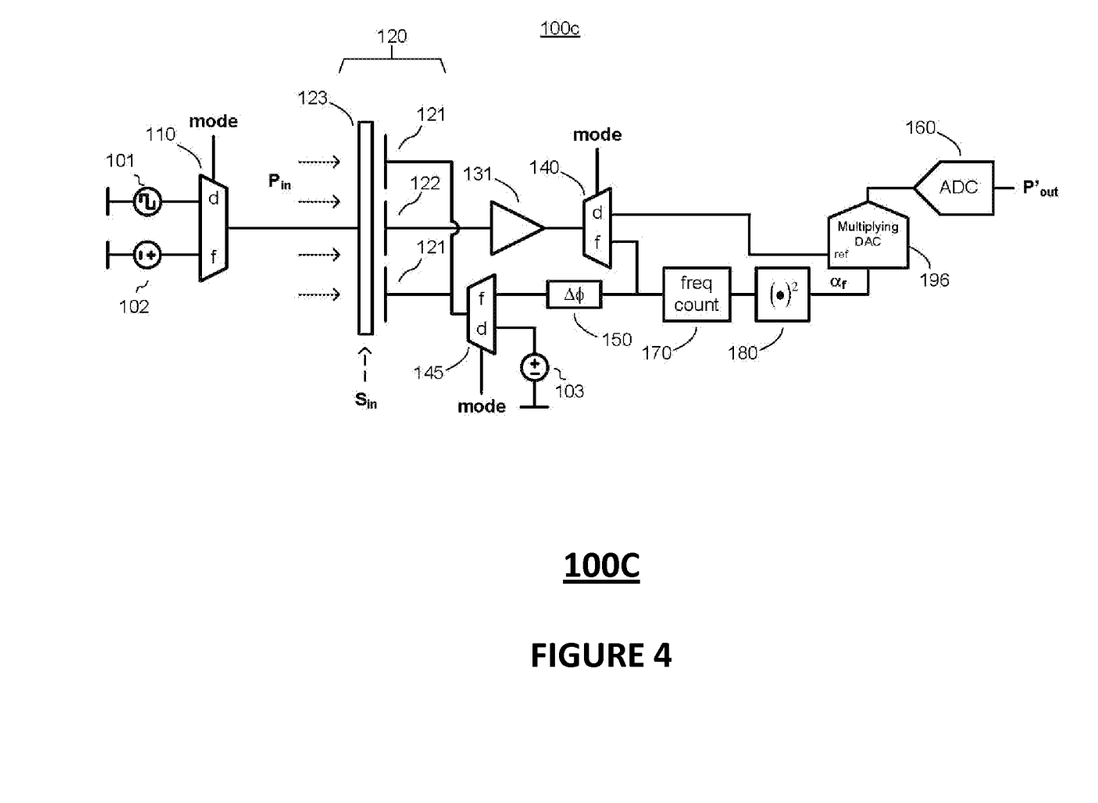
FIG. 4 is the block diagram of a pressure sensor with sensitivity stabilization including a multiplying DAC, in accordance with one or more embodiments of the present invention.

FIG. 4 is the block diagram of a pressure sensor with sensitivity stabilization including a multiplying DAC, in accordance with one or more embodiments of the present invention.

From FIG. 4, the pressure sensor 100C, in a preferred embodiment, includes similar components as set forth in FIGS. 1-3. The pressure sensor 100C includes a drive voltage 101, a DC voltage source 102, and a first multiplexer 110. The pressure sensor further includes a pressure sensor MEMS device 120, a second multiplexer 145, a sense amplifier 131, a third multiplexer 140, and a phase shifter 150. Additionally, the pressure sensor includes an analog-to-digital converter (ADC) 160, a frequency counter 170, a digital square calculator 180, and a multiplying DAC 196.

In the embodiment of FIG. 4, when operating the present invention in "displacement mode", a voltage source with periodic waveform 101 drives the MEMS diaphragm 123 with amplitude $V_d$ through the multiplexer 110. As in FIGS. 1-3, a total signal charge of $Q_s$ is transferred into the sense amplifier 131, is processed, and converted by the ADC 160 to digital signal $P'_{out}$ after receiving input from a multiplying DAC 196 having input of the multiplexer 140 and further input of the calibration coefficient from the calculator 180.

From FIG. 4, when operating in the "frequency mode (mode "f")", DC voltage 102 is applied to the diaphragm 123 through multiplexer 110 to lower its motional impedance. The sense electrode 122 is connected to the input of the sense amplifier 131. The sense amplifier 131 drives the phase shifter 150 through the multiplexer 140 while the phase shifter 150 drives the drive electrodes 121 through multiplexer 145. The multiplexer 145 is also connected with the voltage source 103. The oscillation frequency is measured by the frequency counter 170, and the output is squared by the digital square calculator 180 to generate a calibration coefficient $\alpha_f$. The calibration coefficient $\alpha_f$ is then applied to the multiplying DAC 196, modifying its gain in proportion to the calibration coefficient, thereby stabilizing the sensitivity.

From FIG. 4, a pressure sensor is provided in which there is a multiplying DAC between the sense amplifier and the ADC, wherein multiplying DAC provides combined measurement outputs of displacement and natural frequency.

Figure 5:
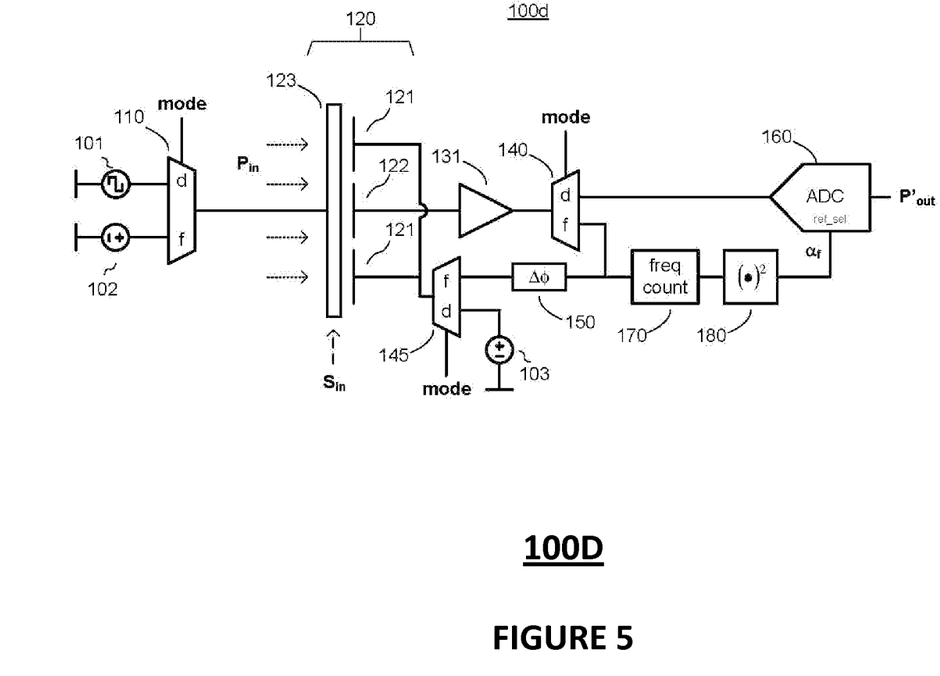
FIG. 5 is the block diagram of a pressure sensor with sensitivity stabilization in which a calibration coefficient is provided to the analog to digital converter (ADC), in accordance with one or more embodiments of the present invention.

FIG. 5 is the block diagram of a pressure sensor with sensitivity stabilization in which a calibration coefficient is provided directly to the analog to digital converter (ADC), in accordance with one or more embodiments of the present invention.

From FIG. 5, the pressure sensor 100D, in a preferred embodiment, includes similar components as set forth in FIGS. 1-4. The pressure sensor 100D includes a drive voltage 101, a DC voltage source 102, and a first multiplexer 110. The pressure sensor further includes a pressure sensor MEMS device 120, a second multiplexer 145, a sense amplifier 131, a third multiplexer 140, and a phase shifter 150. Additionally, the pressure sensor includes an analog-to-digital converter (ADC) 160, a frequency counter 170, and a digital square calculator 180.

In the embodiment of FIG. 5, when operating the present invention in "displacement mode", a voltage source with periodic waveform 101 drives the MEMS diaphragm 123 with amplitude $V_d$ through the multiplexer 110. As in FIGS. 1-4, a total signal charge of $Q_s$ is transferred into the sense amplifier 131, is processed, and converted by the ADC 160 to digital signal $P'_{out}$ after receiving input from the multiplexer 140 and further input of the calibration coefficient from the calculator 180.

From FIG. 5, when operating in the "frequency mode (mode "f")", DC voltage 102 is applied to the diaphragm 123 through multiplexer 110 to lower its motional impedance. The sense electrode 122 is connected to the input of the sense amplifier 131. The sense amplifier 131 drives the phase shifter 150 through the multiplexer 140 while the phase shifter 150 drives the drive electrodes 121 through multiplexer 145. The multiplexer 145 is also connected with the voltage source 103. The oscillation frequency is measured by the frequency counter 170, and the output is squared by the digital square calculator 180 to generate a calibration coefficient $\alpha_f$. The calibration coefficient $\alpha_f$ is then applied to the ADC 160, modifying its gain in proportion to the calibration coefficient, thereby stabilizing the sensitivity.

Figure 6:
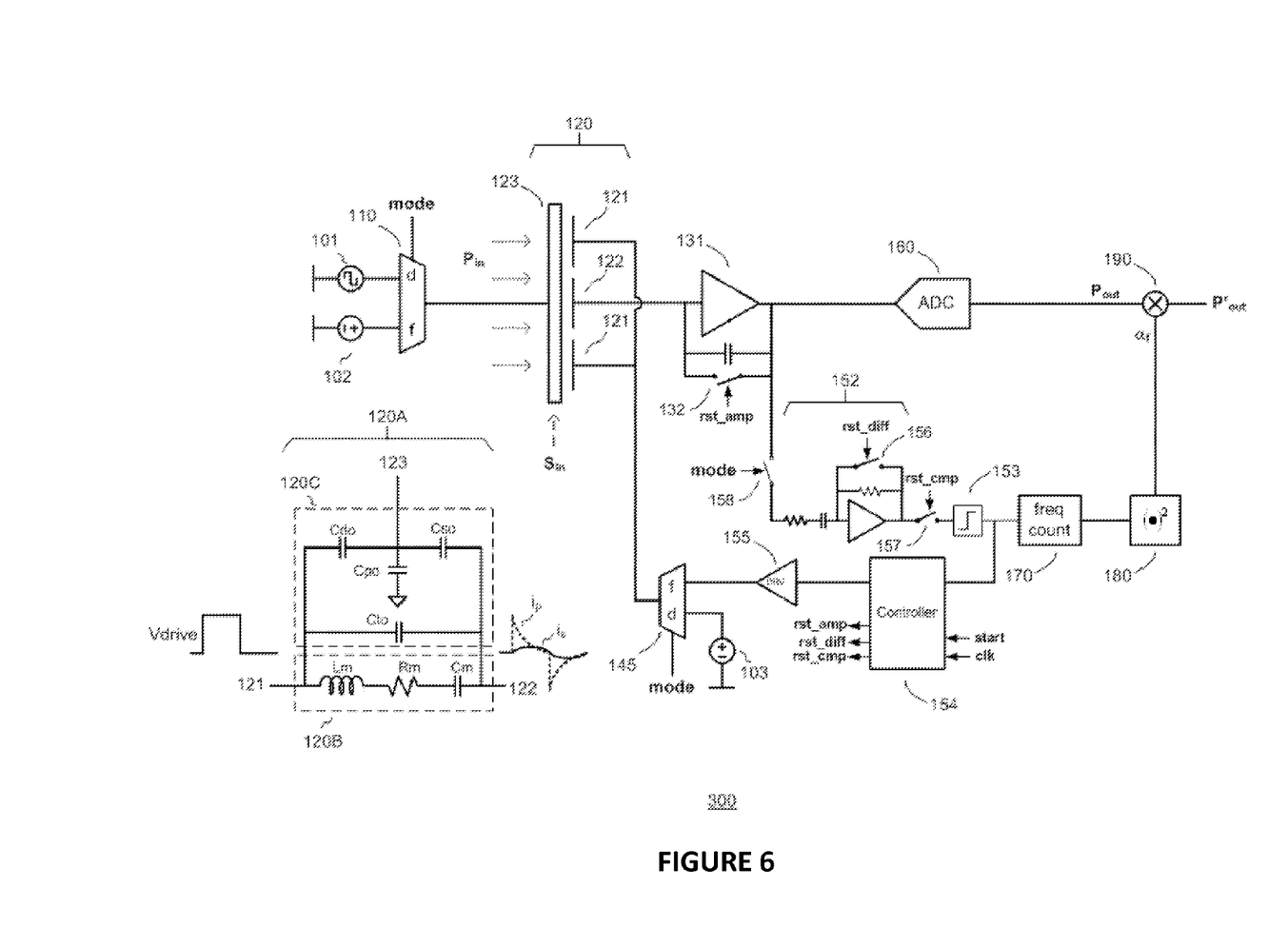
FIG. 6 is the block diagram of a pressure sensor with sensitivity stabilization in accordance with one or more embodiments of the present invention.

FIG. 6 is the block diagram of a pressure sensor 300 with sensitivity stabilization in accordance with one or more embodiments of the present invention.

From FIG. 6, the pressure sensor 300, in a preferred embodiment, includes similar components as set forth in FIGS. 1-5. The pressure sensor 300 includes a drive voltage 101, a first DC voltage source 102, and a first multiplexer 110. The pressure sensor further includes a pressure sensor MEMS device 120, a second multiplexer 145, a DC voltage source 103, a control block 154 with input control signals start and clk and output signals rst_amp, rst_diff, and rst_cmp, a trans-capacitance sense amplifier 131 with a first reset switch 132 controlled by signal rst_amp from the control block 154, a switch 158, a differentiator 152 with a second reset switch 156 controlled by signal rst_diff from the control block 154, a switch 157 controlled by signal rst_cmp from control block 154, a comparator 153, and a high voltage driver 155. Additionally, the pressure sensor includes an analog-to-digital converter (ADC) 160, a frequency counter 170, a digital square calculator 680, and a digital multiplier 190.

In one or more embodiments, when operating the present invention in "displacement mode", a voltage source with periodic waveform 101 drives the MEMS diaphragm 123 with amplitude $V_d$ through the multiplexer 110. As in FIGS. 1-5, a total signal charge of $Q_s$ is transferred into the sense amplifier 131, is processed, and converted by the ADC 160 to digital signal $P_{out}$.

From FIG. 6, MEMS model 120A shows the equivalent electrical model of the pressure sensor MEMS device 120. It includes a series resonant network 120B and a parasitic capacitor network 120C. The natural frequency of the diaphragm 123 can be represented as $$f_{osc} = \sqrt{\frac{L_m}{C_m}}.$$

When operating the present invention in "frequency mode", drive electrodes 121 is driven and there are two current signals that will flow out of the sense electrode 122: (1) current $i_s$ is the desired signal from the series resonant network 120B at frequency $f_{osc}$, and (2) current $i_p$ is an undesired signal from the parasitic capacitor network 120C. Due to the high MEMS motional impedance of a pressure sensor, typically is is much smaller than that of $i_p$. Therefore, if employing a standard oscillator topology, e.g. Pierce oscillator, in the frequency mode, either oscillation may not occur, or the oscillation frequency will not be relevant to the pressure sensor diaphragm natural frequency. A system and method in accordance with the present invention introduces the comparator 153, control block 654 and switches 132, 156, and 157 to ensure proper oscillation.

To start the oscillation, control block 154 triggers a voltage step Vdrive to drive electrodes 121 through the voltage driver 155 and the second multiplexer 145. Reset switch 132 is enabled at the time to prevent a large magnitude of $i_p$ from saturating sense amplifier 131, and is only disabled to recover sense amplifier functionality after $i_p$ decays to a magnitude level comparable to $i_s$. Reset switch 156 is enabled at the same time as the switch 132 is enabled, and is disabled slightly after the switch 132 is disabled to avoid glitches from sense amplifier 131 coupling to the differentiator 152. Switch 157 is disabled when the switch 132 is enabled, and is enabled slightly after the switch 156 is disabled to avoid false triggering of the comparator 153. Provided that $i_p$ decays faster than $i_s$, the zero-crossing of the voltage waveform at the input of the comparator 153 is determined by $i_s$, and the time duration from the voltage step of Vdrive to comparator zero-crossing is thus close to $\frac{1}{2}f_{osc}$. Once the comparator zero-crossing occurs, control block 154 generates a voltage step in the opposite direction, and the same control scheme is applied to the switches 132, 156, and 157 again to complete the remaining half cycle of the oscillation. The control scheme is repeated for the oscillation to build up and the frequency is close to pressure sensor diaphragm natural frequency. Once oscillation is established, the frequency counter 170 and the squaring block 180 will calculate the calibration coefficient $\alpha_f$, and a compensated pressure sensor digital signal $P'_{out}$ is generated by multiplying $P_{out}$ by $\alpha_f$ through multiplier 190.

Figure 7:
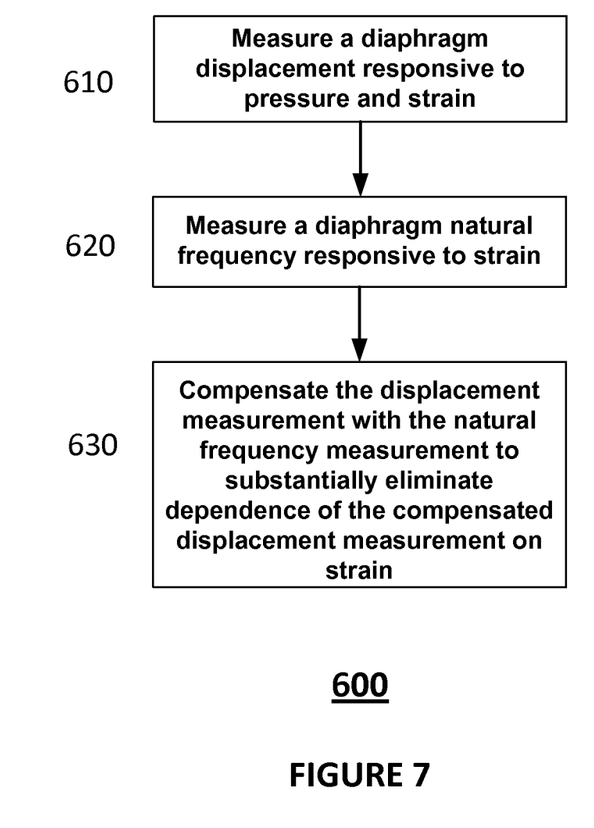
FIG. 7 depicts an embodiment of the sensitivity stabilization method of the present invention.

FIG. 7 depicts an embodiment 600 of the sensitivity stabilization method of the present invention. From FIG. 7, the pressure sensor stabilization method comprises the step of measuring a diaphragm displacement responsive to pressure and strain at 610. At 620, the method undertakes to measure a diaphragm natural frequency responsive to strain. At 630, the method provides for compensating the diaphragm displacement measurement with the diaphragm natural frequency measurement to thereby substantially eliminate a dependence of the compensated displacement measurement on strain. It will be appreciated that the step of measuring may include further aspects of determining, calculating, processing and/or deducing. It will further be appreciated that the step of compensating may employ analog hardware, digital hardware, firmware or software to accomplish the compensation.

Further, the present invention in one or more embodiments, may include one or more of the following arrangements and capabilities: a sense amplifier providing combined measurement outputs of the natural frequency and the displacement; a sensing system comprising an analog-to-digital converter (ADC); an ADC providing the combined measurement outputs of natural frequency and the displacement; a pressure sensor comprising a voltage source with a periodic waveform; a pressure sensor having a multiplier block situated between the sense amplifier and the ADC; a multiplier block being one or more of an analog multiplier or a multiplying digital to analog converter (DAC); a pressure sensor having a digital multiplier coupled to the ADC; and, a pressure sensor wherein the ADC provides for combined outputs of natural frequency and the displacement.

Additionally, the present invention in one or more embodiments, may also provide for one or more of the following: a pressure sensor having: i) a voltage source with a periodic waveform provided to a first input of a first multiplexer; wherein the voltage source is in a first mode driving the diaphragm; and, ii) one or more sensing electrodes coupled to the diaphragm for detecting the displacement of the diaphragm by measuring a signal charge due to the driving of the diaphragm; and, a pressure sensor having an oscillator comprising a direct current (DC) voltage and providing to a second input of a first multiplexer; the DC voltage in a second mode biasing the diaphragm, essentially providing for oscillation; a sense electrode is coupled to an input of the sense amplifier; wherein the sense amplifier is coupled to phase shifter, wherein the phase shifter is coupled to a drive electrode, and wherein a loop is formed from the sense electrode to the drive electrode.

Further, the present invention in one or more embodiments, may also provide for one or more of the following: a pressure sensor having a sense amplifier coupled to a phase shifter through a second multiplexer; a pressure sensor having a frequency counter generating a calibration coefficient for multiplying with the measurement of the displacement to correct for sensitivity shift; a pressure sensor having a calibration coefficient that is a square of the natural frequency; and, a pressure sensor having a frequency counter that comprises a squaring block.

Advantageously, the present invention provides an approach and device that improves the stability of a pressure sensor by compensating a pressure sensor's sensitivity shift due to packaging and/or assembly by stabilizing the sensitivity and reducing the error caused by strain-related sensitivity shift. Additionally the present invention also provides for substantially eliminating the sensitivity calibration of a pressure sensor after packaging or assembly, such that the option of providing for less costly packaging.

Accordingly, it will be appreciated by those skilled in the art that there are numerous variations and implementations to the present invention. The present invention relates generally to pressure sensors, and more particularly relates to improving stability of pressure sensors for improved performance.

In the described embodiments, the system and method can be any circuit, software, process and/or method, including an improvement to an existing software program, for instance.

Although the present invention has been described in accordance with the embodiments shown, one of ordinary skill in the art will readily recognize that there could be variations to the embodiments and those variations would be within the spirit and scope of the present invention, such as the inclusion of circuits, electronic devices, control systems, and other electronic and processing equipment. Accordingly, many modifications may be made by one of ordinary skill in the art without departing from the spirit and scope of the appended claims. Many other embodiments of the present invention are also envisioned.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A pressure sensor comprising:
a diaphragm, wherein the diaphragm is displaced responsive to pressure;
driving electrodes and a sensing electrode, wherein capacitance of the sensing electrode changes responsive to the diaphragm displacement responsive to the pressure, wherein in displacement mode of the pressure sensor the pressure is determined and wherein in frequency mode of the pressure sensor a natural frequency of the diaphragm is measured;
a phase shifter that forms a loop from an output of the sensing electrode to the driving electrodes to drive the diaphragm when the pressure sensor is in the frequency mode, and wherein the phase shifter is configured to phase shift a signal received from the sensing electrode to create an oscillation frequency within the loop, wherein the oscillation frequency is associated with the natural frequency of the diaphragm; and
a frequency counter measuring the oscillation frequency within the loop when the pressure sensor is in the frequency mode, wherein the determined pressure is adjusted based on the determined natural frequency to produce a compensated measurement of the pressure.

2. The pressure sensor of claim 1, wherein the frequency counter provides the measurement output of the natural frequency of the diaphragm.

3. The pressure sensor of claim 2 further comprising a sense amplifier.

4. The pressure sensor of claim 3, wherein the sense amplifier provides combined measurement outputs of the natural frequency and the displacement.

5. The pressure sensor of claim 3 further comprising an analog to digital converter (ADC) coupled to the driving electrodes and the sensing electrode.

6. The pressure sensor of claim 5, wherein the ADC provides the combined measurement outputs of the natural frequency and the displacement.

7. The pressure sensor of claim 3, wherein a voltage source provides a periodic waveform to a first input of a first multiplexer; and the sensing electrode coupled to the diaphragm for detecting the displacement of the diaphragm by measuring a signal charge due to the driving of the diaphragm.

8. The pressure sensor of claim 5, wherein a multiplier block is coupled between the sense amplifier and the ADC; wherein the multiplier block provides combined measurement outputs displacement and natural frequency.

9. The pressure sensor of claim 8, wherein the multiplier block comprises an analog multiplier.

10. The pressure sensor of claim 8, wherein the multiplier block comprises a multiplying digital to analog converter (DAC).

11. The pressure sensor of claim 5, wherein a digital multiplier is coupled to the ADC; wherein digital multiplier provides combined measurement outputs of displacement and the natural frequency.

12. The pressure sensor of claim 7, wherein a direct current (DC) voltage is provided to a second input of the first multiplexer, wherein the sense electrode is coupled to an input of the sense amplifier, and wherein the sense amplifier is coupled to the phase shifter, and wherein the phase shifter is coupled to the drive electrodes.

13. The pressure sensor of claim 3, wherein the sense amplifier is coupled to a multiplexer and the multiplexer is coupled to an ADC in the displacement mode and to the phase shifter in the frequency mode.

14. The pressure sensor of claim 1, wherein the frequency counter generates a calibration coefficient, which is then multiplied with the measurement of the displacement to correct for sensitivity shift of the pressure sensor.

15. The pressure sensor of claim 14, wherein the calibration coefficient comprises a square of the natural frequency.

16. The pressure sensor of claim 14, wherein the frequency counter comprises a squaring block.

17. A pressure sensor stabilization method comprising the steps of:
   measuring a diaphragm displacement responsive to pressure and strain during a displacement mode by measuring changes in capacitance of the sensing electrode in response to the pressure;
   forming a loop from an output of the sensing electrode to driving electrodes to drive the diaphragm by electrically coupling the sensing electrode to the driving electrodes when in a frequency mode, wherein the forming the loop creates an oscillation frequency within the loop, and wherein the oscillation frequency is associated with a natural frequency of the diaphragm;
   measuring the oscillation frequency to determine the natural frequency of the diaphragm responsive to the strain; and
   compensating the displacement measurement with the natural frequency determination to eliminate dependence of the compensated displacement measurement on strain.

18. The method of claim 17, further comprising the step of generating a calibration coefficient using a frequency counter for multiplying with a measurement of a displacement to correct for sensitivity shift.

19. The method of claim 18, wherein the calibration coefficient is a square of the natural frequency.

20. The method of claim 18, wherein the frequency counter comprises a squaring block.

* * * * *